United States Patent [19]

Seiderman

[11] 4,256,407
[45] Mar. 17, 1981

[54] CULINARY MIXER AND DISINTEGRATOR

[76] Inventor: Maurice Seiderman, 3306 Deronda Dr., Hollywood, Calif. 90068

[21] Appl. No.: 641,165

[22] Filed: Dec. 16, 1975

[51] Int. Cl.³ .......................... B01F 7/00; B01F 15/00
[52] U.S. Cl. ..................................... 366/300; 99/510;
    241/46 B; 241/46.17; 241/73; 241/74; 366/186
[58] Field of Search ................... 259/6, 21, 41, 104;
    366/300, 314, 186; 99/510; 241/46 B, 46.17, 73, 74

[56] References Cited
U.S. PATENT DOCUMENTS

| 2,321,092 | 6/1943 | Lomax | 259/104 |
| 3,285,582 | 11/1966 | Hubner | 259/104 |
| 3,722,831 | 3/1973 | Bialas | 366/300 |
| 3,768,786 | 10/1973 | Troy | 259/104 |

Primary Examiner—Robert I. Smith
Attorney, Agent, or Firm—Burns, Doane, Swecker & Mathis

[57] ABSTRACT

A culinary mixer and disintegrator for receiving material to be blended, comminuted, or liquefied, having a container body defining a lobular cavity for accommodating the material to be blended, comminuted, or liquefied, the cross section of the cavity being of generally Figure-8 configuration with plural distinct lobes, each provided with a comminutor/blender blade rotatably disposed therein.

6 Claims, 4 Drawing Figures

U.S. Patent  Mar. 17, 1981  4,256,407
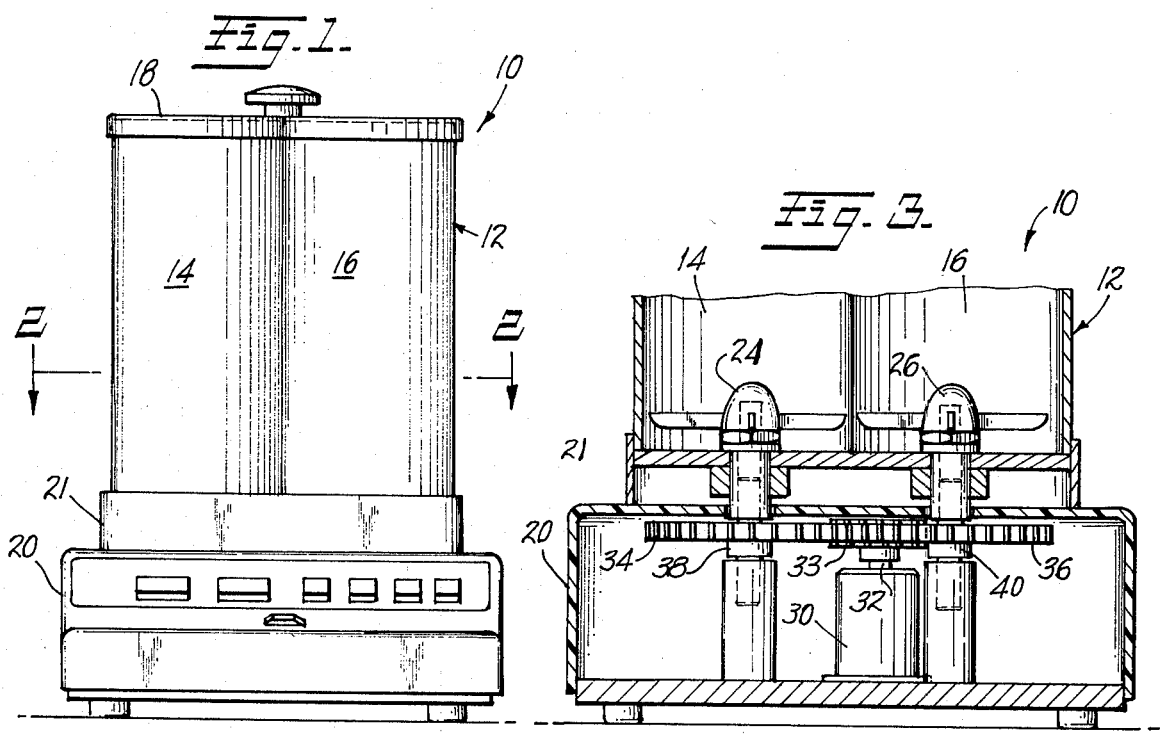
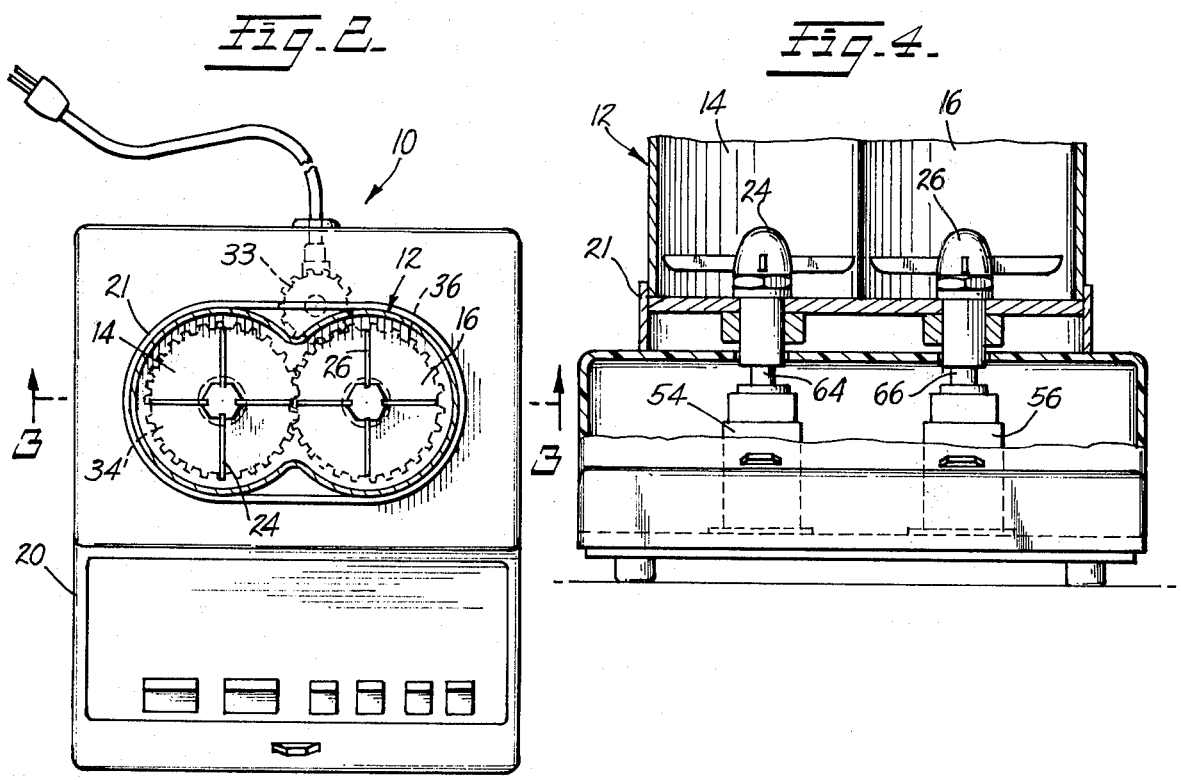

CULINARY MIXER AND DISINTEGRATOR

BACKGROUND OF THE INVENTION

The present invention relates generally to culinary mixers and disintegrators useful for blending, comminuting, or liquefying a food product. However, the device of the present invention is capable of receiving any type of liquid, or solid susceptible of comminution. However, for the sake of clarity, the device of the present invention will be described with reference to culinary mixers commonly found in the home.

Food blenders and liquefiers have grown in popularity and are now a commonly encountered kitchen aid in most households. Their utility ranges from blending food products to the liquefaction of such materials. For example, the blending of various ingredients preparatory to cooking is greatly facilitated. Similarly, the consistency of many food products may be readily altered into a more convenient form for individuals, such as infants, who have difficulty in mastication. Likewise, fruits and vegetables are easily liquefied to a nourishing drink. The breadth of utility has generally been confined to the limits of the user's imagination. However, it has been found that optimum results from prior art devices are achievable only at great inconvenience as the demands on these culinary devices begin to exceed their capabilities.

One of the most noted deficiencies in prior art culinary mixers and disintegrators is a tendency for "bridging". As food product is added and the agitator/cutter blade rotated, there is a pronounced tendency for the product in closest proximity to the rotating blade to become overly liquefied while holding above material which does not encounter the disintegrating or blending action of the blade. In such an event, the user must resort to the insertion of a tool in order to aid the desired blending action, which is not only inconvenient but dangerous. Some devices have resorted to intermittent operation of the motor to cure this bridging tendency, but have not completely overcome the problem.

In order to operate most effectively, it is necessary to establish a vortex-type flow within the container which receives the food product. When the proper vortex flow is established there will be constant movement of the food product within the container cavity in order that uniformity of blending or comminution occurs. The proper mass flow within the container cavity is dependent predominantly upon the geometry of both the cutter blade and the container itself. In order to obtain the wide range of agitation demanded by today's consumer [i.e., blending through liquefaction], prior art devices have concentrated significantly upon modification of the rotating blade and the drive motor therefor. Little attention has been directed toward the container cavity itself notwithstanding its manifestly abundant affect upon the successful operation of the device.

Accordingly, it is the major object of the present invention to provide a culinary mixer and disintegrator with a container cavity adapted to maximize the mass flow of the product disposed therein whereby dramatic improvement in homogeneity of the blended or comminuted product is exhibited.

It is also an object of the present invention to provide a lobular cavity for receiving a food product to be blended, comminuted, or liquefied with comminutor/blender blades rotatably disposed within each of a plurality of lobes of the container.

Yet another object of the present invention is to provide independent control of each of the comminutor/blender blades in order to further maximize the efficiency of the device.

Yet further objects and advantages will become apparent upon examination of the following detailed description of the invention taken in conjunction with the appended figures of drawing wherein:

FIG. 1 is a front elevational view of the device of the present invention;

FIG. 2 is a horizontal sectional view taken substantially along the line 2—2 of FIG. 1;

FIG. 3 is an enlarged fragmentary vertical sectional view, taken substantially along the line 3—3 of FIG. 2; and FIG. 4 is a vertical sectional view, partly in elevation, showing a modification of the device of the present invention.

SUMMARY OF THE INVENTION

In accordance with the foregoing objects and advantages of the present invention, and in response to the deficiencies of prior art culinary mixers and disintegrators, there is provided a device having a container cavity of generally Figure-8 configuration with a plurality of distinct lobes, each of which is provided with a comminutor/blender blade rotatably disposed therein. The cavity is designed to be engaged with a motor unit, as is conventional, for the rotation of the blades. In one embodiment, each of the blades is independently rotated whereby speed and direction thereof may be adjustably controlled. In another embodiment, the blades are "slaved" either within the motor housing, or preferably at the base of the container in order that the blades are driven in opposite directions. The generally Figure-8 cross-sectional configuration of the container adds dramatically to the proper mass flow distribution therein while the plurality of rotatable blades magnifies the efficiency of the device.

DETAILED DESCRIPTION OF THE INVENTION

In order to more fully elucidate upon the foregoing objects and advantages, the following detailed description of the invention will be given in terms of various preferred embodiments thereof. However, the same are intended to be illustrative and is nowise limitative.

The efficiency of a culinary mixer rests significantly upon the geometry of both the rotating blade and container cavity. In order to optimize the blending or comminuting action of such devices, it is essential that the proper mass flow of material be established within the container to insure homogeneity of the finished product. Shear forces at the container side walls and the manner in which these forces direct the flow of material have significant effects upon the uniformity of mixing or disintegrating. The present invention achieves maximum homogeneity through combination of a specifically designed container and the blades disposed therein.

FIG. 1 shows the blender of the present invention, designated generally as 10. The blender is comprised of a container 12 having a plurality of lobes 14 and 16, to be described more fully hereinbelow. The container is fitted with a cover 18, as is conventional, and is in operative communication with a base 20 housing at least one motor. Controls are provided on base 20 for appropriate adjustment of the motor unit. As is conventional, container body 12 may be removed from base 20 to facilitate cleaning.

The dramatic improvement in the efficiency of the blender of the present invention is derived in part from the geometrical configuration of container body 12. As best viewed in FIG. 2, this container body is formed in a generally Figure-8 cross section having two lobes 14 and 16. In the exemplified blender, the container is fabricated by joining two partial cylinders along the arcs thereof. However, any lobular geometry derived from such shapes as ovals, elipses, parabolas, hyperbolas and the like, are envisioned within the scope of the present invention. The lobes 14 and 16 form semi-independent agitation zones, each provided with a rotatable comminutor/blender blade, 24 and 26, respectively, therein. When the container body 12 is seated upon motor unit 20, operative communication therebetween is established by at least one shaft protruding upwardly from base 20 and engaging the rotatable shaft.

The operative engagement between the motor and blades is shown in one embodiment in FIG. 3. FIG. 3 shows a single speed-controllable motor 30 having a drive shaft 32 and sprocket 33. The sprocket 33 operatively engages sprockets 34 and 36 driving same as motor 30 is energized. Each of sprockets 34 and 36 are affixed upon journalled shafts 38 and 40 which are free to spin. Shafts 38 and 40 protrude upwardly from base 20 and engage the lower portions of rotatable blades 24 and 26, respectively. While FIG. 3 depicts the single motor 30 geared to the shafts 38 and 40, various other arrangements may be employed. For example, motor 30 may directly drive one of the blades with the other in slaved engagement therewith. Along these lines, the gearing may be accomplished within motor unit 20 or at the base of the removable container 12. All such modifications are within the scope of the present invention and well within the skill of the art. The preferred mode of gearing the embodiment of FIG. 3 results in rotation of the blades 24 and 26 in opposite directions.

FIG. 4 shows an alternate, and most preferred embodiment, wherein base 20 houses two independent speedcontrollable motors 54 and 56. Each of these motors directly drives blades 24 and 26, respectively, through directly coupled shafts 64 and 66, respectively. In this embodiment, the blades may be rotated in the same or opposite directions and at the same or different speeds depending upon the desires of the user. This capability, coupled with the enhanced agitation achievable by virtue of the geometry of the container, manifestly enhances the efficiency of the device.

In operation, the material to be blended, comminuted, or liquefied, is placed within the container 12. The container is fitted into operative engagement with base 20 and is guided and retained by means of upturned edge 21. Once the container has securely been affixed with the motor shafts in engagement with the rotatable blades in conventional manner, the blades are rotated by energizing the motor or motors, depending upon the embodiment. As blades 24 and 26 rotate, semi-independent agitation zones are established within lobes 14 and 16. Material flow is exceedingly uniform from top to bottom with a noticeable absence of any bridging effect. Even with the most difficult of food products (i.e., meats) any bridging which may initiate is rapidly overcome due to the configuration of the container in combination with the rotating blades.

While the embodiment of FIG. 3, having a single drive motor, is extremely effective, the embodiment of FIG. 4 is preferred for reasons of even greater efficiency, notwithstanding somewhat greater cost of manufacture due to the additional motor. The embodiment of FIG. 4 provides independently controllable motors which may rotate the agitator blades at varying speeds and directions wholly independent of one another. This provides the consumer with a much greater range of utility than achievable with prior art devices which must resort to intermittent bursts of rotation in order to overcome bridging tendencies. Accordingly, the efficiency from blending through liquefaction is dramatically enhanced.

While the invention has now been described in terms of various preferred embodiments, the skilled artisan will readily appreciate that various modifications, changes, omissions, and substitutions may be made without departing from the spirit thereof. Accordingly, it is intended that the invention be limited solely by the scope of the following claims.

What is claimed is:

1. A high-speed blending device adapted for receiving material to be blended, comminuted, or liquefied, said device comprising:
    (a) a container body having a lobular cavity, defined by upstanding side walls and a bottom wall, for receiving said material, said cavity having a cross-section of generally Figure-8 configuration and defining a pair of distinct, overlapping lobes for semi-independent agitation zones;
    (b) a single commmunitor/blender blade member assembly rotatably disposed in each of said lobes proximate said bottom wall, said assembly consisting essentially of a plurality of coaxially and commonly circumferentially mounted individual blade members, each of said blade member assemblies being rotatably movable on a path in essentially the same horizontal plane, and each such path being non-overlapping with respect to the other; and
    (c) said container body (a) together with said comminutor/blender blade member assemblies (b) defining means for cooperatively insuring vortex and non-bridging flow of said material therein.

2. The device of claim 1, further comprising a base for releasable, operative engagement with said container body, said base housing at least one speed-controllable motor adapted for operative communication with said blades.

3. The device of claim 2, wherein said base houses a single speed-controllable motor having an output shaft geared to two independent drive shafts, said drive shafts coupled to said blades, whereby actuation of said motor effects rotation of said blades at the same speed and in opposite directions.

4. The device of claim 2, wherein said base houses two, independent speed-controllable motors, each having an output shaft coupled to one of said blades for independent speed and direction control thereof.

5. The device of claim 1, wherein said container body is fabricated from two partially formed cylinders joined along the arcs thereof.

6. The device of claim 5, wherein the individual cylinder cross-sections are selected from those consisting of:
    (a) circular;
    (b) ovate;
    (c) elliptical;
    (d) parabolic; or,
    (e) hyperbolic cylinders.

* * * * *